United States Patent [19]
Bodor et al.

[11] Patent Number: 5,895,685
[45] Date of Patent: Apr. 20, 1999

[54] PACKED DAIRY SPREAD AND PROCESS OF MAKING

[75] Inventors: Janos Bodor; Mettina Maria G. Koning, both of Vlaardingen, Netherlands; Jacqueline Adrienne Lanting-Marijs, Vlaardingen, France; Angela Magnus, Durach, Germany

[73] Assignee: Lipton, Division of Conopco, Inc., Englewood Cliffs, N.J.

[21] Appl. No.: 08/843,046

[22] Filed: Apr. 11, 1997

[30] Foreign Application Priority Data

Apr. 12, 1996 [EP] European Pat. Off. ............ 962009965

[51] Int. Cl.$^6$ .................................................. A23C 19/09
[52] U.S. Cl. .................. 426/582; 426/516; 426/517; 426/586; 426/602; 426/603
[58] Field of Search ........................... 426/582, 586, 426/602, 603, 516, 517

[56] References Cited

U.S. PATENT DOCUMENTS

| | | | |
|---|---|---|---|
| 2,971,847 | 2/1961 | Babel et al. | 426/582 |
| 3,767,338 | 10/1973 | Soderlund et al. | |
| 4,578,278 | 3/1986 | Morley | 426/586 |
| 4,772,483 | 9/1988 | Nolte. | |
| 5,009,913 | 4/1991 | Ahmed et al. | 426/582 |
| 5,194,283 | 3/1993 | Dupas et al. | 426/582 |

FOREIGN PATENT DOCUMENTS

| | | |
|---|---|---|
| 641 150 | 12/1963 | Brazil. |
| 847 554 | 10/1939 | France. |
| 59-031677 | 2/1984 | Japan. |
| 946 927 | 1/1964 | United Kingdom. |
| 2056839 | 3/1981 | United Kingdom. |
| 91/00690 | 1/1991 | WIPO. |
| 95/14389 | 6/1995 | WIPO. |

*Primary Examiner*—Helen Pratt
*Attorney, Agent, or Firm*—Gerard J. McGowan, Jr.

[57] ABSTRACT

The invention provides a packed dairy spread that includes two inhomogeneously combined components. The spread contains 10–95 wt % of a component (A) that has a coagulated casein network, a pH of 4.3–5.3 and a Stevens value at 5° C. of 150–700 g, and that contains casein and water in a weight ratio of 1:3 to 1:15. The spread further contains 5–90 wt % of a cream (B) that includes 15–60 wt % of dispersed fatphase and 40–85 wt % continuous aqueous phase. The aqueous phase of cream (B) contains casein and water in a weight ratio of less than 1:15. The Stevens value of cream (B) at 5° C. is 75–500 g. The spread can be used e.g. for spreading on bread or toast. It has unusual and attractive organoleptic properties.

9 Claims, No Drawings

PACKED DAIRY SPREAD AND PROCESS OF MAKING

The invention relates to a packed dairy spread and to a process for preparing such spread.

In the past decades, especially the consumption of dairy products like fresh cheese type products and creams has increased. Fresh cheese like products, including such products as quark, traditional cottage cheese and cream cheese are judged to be nutritious because of the high protein content and are appreciated for their fresh, soury taste. Such products are consumed e.g. as dessert, as spread on bread, toast and the like and as filling or decoration in cakes and other bakery products. Creams, e.g. double cream, sour cream, creme fraiche etc. are used as topping or decoration or as taste and texture improver in or with other foods, e.g. bakery products, sauces, fruits, drinks etc. Creams, e.g. clotted cream and "Streichrahm" such as Rottkäpchen® and Brunch® are also used as spread, e.g. on bread or toast. Such products often contain polysaccharide thickening or gelling agents or gelatin. Creams are appreciated for the rich and creamy sensation provided by food products prepared with such creams.

We have found a way to provide dairy spreads, i.e. products suitable for spreading on bread, toast and the like, that deliver an organoleptic experience in terms of taste and texture that was hitherto unknown and that is much appreciated by many people.

Accordingly, the present invention provides a packed dairy spreads comprising

A. 10–95 wt % of a component (A) comprising a coagulated casein network, having a pH of 4.3–5.3 and containing casein and water in a weight ratio of 1:3 to 1:15, the component (A) comprising 0–50 % dispersed fat phase and 50–100 wt % continuous aqueous phase and having a Stevens value at 5° C. of 150–700 g, and B. 5–90 wt % of a cream (B) comprising 15–60 wt % of dispersed fat phase and 40–85 wt % continuous aqueous phase, the aqueous phase comprising casein and water in a weight ratio of less than 1:15, the cream (B) having a Stevens value at 5° C. of 75–500 g wherein the component (A) and the cream (B) are inhomogeneously combined in the packed dairy spread. Preferred embodiments of the product are given in claims 2–8.

The word "combined" indicates that component (A) and cream (B) are in contact with each other. Thus they are not contained in separate compartments of the pack. During preparation, some mixing between the components may occur at their contact surface. Also some migration of constituents may occur during storage. However, mixing and migration may not happen to such a degree that the product contained in the pack is perceived to be homogeneous. "Inhomogeneously" indicates that regions, e.g. having a Inhomogeneous means not homogeneous size of at least about 1 mm³, preferably 0.5–300 cm³, most preferably 5–50 cm³, with different composition and texture can be identified in the pack.

The component (A) can for example be a fresh cheese type product while the cream (B) can be a creme fraiche like component, as is described in more detail below. We found that by inhomogeneously combining the two components, the resulting product gives a very surprising organoleptic impression. The taste and texture of the 2 components can be separately perceived in the mouth. Having this complexity of taste and texture impressions itself is an unusual experience.

The organoleptic sensation depends on the properties of each of the two components and the relative amounts in which they are present. Typically the product gives the impression of being simultaneously cool and fresh as well as warm and creamy. Presumably, the cool, fresh sensation originates from component (A) while the warm creamy experience seems to originate from component (B).

When evaluating such product for example containing fresh cheese and creme fraiche like components in equal amounts, for most people the taste seems to be dominated by the fresh cheese component while the mouthfeel impression is dominated by the creme fraiche component. This combination of taste and mouthfeel is also a surprising experience. When tasting the taste of a fresh cheese like product, one expects an accompanying somewhat rough mouthfeel, not a very smooth creamy texture. Reversely, one expects a smooth creamy texture to be accompanied by a relatively bland taste, not by a relatively pronounced fresh, soury taste like that of fresh cheese like products. If for comparison, the two components are mixed homogeneously, not only the exciting complexity of organoleptic impressions is lost, but the resulting product seems to be relatively boring and uninteresting. Neither its taste nor its texture is particularly attractive.

We do not wish to be bound by theory, but we believe that, with respect to the taste, if the two components are inhomogeneously mixed the local high concentrations of taste imparting substances in the mouth gives a stronger taste impression than if the same amount of taste imparting substances is released in the mouth spread out over a larger area. Regarding the mouthfeel, we believe the casein network of component (A) to be broken down in the mouth relatively slowly by the action of mastication and movement of the tongue. Component (A) remains present in the mouth relatively long as pieces of significant size in all 3 dimensions. Cream (B) however, having no or only a weak casein network but a substantial amount of fat, disperses more quickly and easily into more film like material, thereby coating relatively large parts of the mouth and also of pieces of component (A) thereby making the creamy mouthful the dominant texture sensation. These hypotheses would also explain why both the fresh soury taste impression and the creamy mouthful sensation are largely lost if the components (A) and (B) are mixed homogeneously and why especially the component (A) must have a certain firmness to obtain the desired organoleptic impression. The organoleptic impressions can be fine-tuned e.g. by adapting the relative amounts of the two components, their taste and/or their rheology. To obtain the desired effect, the two components should have sufficient firmness. It appears that if the components are too soft, mixing in the mouth occurs quickly and the special sensations are largely lost. The firmness can suitably be characterised by means of the Stevens value.

The invention also provides a process for preparing the present spread, wherein a component (A) as described above is extruded through one or more extrusion mouths into a container, a cream (B) as described above is extruded through one or more separate extrusion mouths into the same container and the filled container is closed, wherein the extrusion is controlled such that the closed container contains 10–95 wt % of the component (A) and 5–90 wt % of the cream (B).

Preferred embodiments of the process are given in claims 9–10.

To be able to get the desired organoleptic properties the spread should comprise 10–95 wt % of component (A) and 5–90 wt % of the cream (B). Preferably the product comprises 30–90 wt % of component (A) and 10–70 wt % of cream (B), especially 40–80 wt % of component (A) and 60–20 wt % of cream (B). The spread may comprise other materials than component (A) and cream (B). For example, it may include pieces of preserved fruit, nuts, herbs etc. However the combined amount of component (A) and cream (B) preferably constitutes 60–100 wt %, more preferably 80–100 wt % of the spread. Most preferably the spread consists of component (A) and cream (B).

As is described in more detail below, the product can for example be filled into the container using a nozzle with an even number of extrusion mouths in a circular arrangement. By extruding component (A) and cream (B) simultaneously, with cream (B) being filled through extrusion mouths adjacent to those through which component (A) is filled, for example a packed product can be obtained in which the component (A) and cream (B) are present in alternating regions, resembling the shape of a grape-fruit or of a small cake divided in wedges. At the contact surface of component (A) and cream (B) some mixing may occur between the 2 compositions but overall the product is constituted of regions consisting predominantly of component (A) and regions consisting predominantly of cream (B).

To get the desired organoleptic impression preferably the component (A) and cream (B) have been combined in the packed spread such that the spread comprises one or more regions predominantly consisting of component (A) and one or more regions predominantly consisting of cream (B) wherein the average distance between the centre of a region of component (A) and the centre or centres of the one or more adjacent regions of cream (B) is in the range of 0.1–8 cm, more preferably 0.3–5 cm, especially 0.5–3 cm.

If the components (A) and (B) are present in the pack such that the regions have sizes in the 3 dimensions that are in the same order of magnitude then by the centre is meant the centre of mass. If the shape of the regions is for example more layer-like then preferably the average distance from the middle of one layer to the middle of the adjacent layer or layers should have the indicated size. The individual regions should be big enough to allow the above described organoleptic impression to be obtained. On the other hand the regions should preferably be small enough to allow the consumer to take product out of the pack using e.g. a knife such that product is taken comprising both material consisting predominantly of component (A) and material consisting predominantly of cream (B).

To support the organoleptic properties of the spread with a visual impression, it is preferred for component (A) and cream (B) to be different in colour such that it is perceivable with the naked eye. Thus the product will have at least 2 regions in the pack with perceivably different colours. For example, component (A) can be nearly white, containing no colorant, while component (B) can be made slightly more yellowish e.g. by incorporating some β-carotene into the cream.

The presence of a small amount of fat in component (A) is preferred to obtain optimal mouthfeel. On the other hand, the fat content of component (A) is preferably not too high, to prevent the taste from being masked and the overall product from becoming heavy. Therefore the component (A) preferably comprises 3–30 wt %, more preferably 5–20 wt % fat phase, the balance consisting of aqueous phase. The fat phase of component (A) consists essentially of fat. The fat may comprise or consist of fat of vegetable origin but preferably 40–100 wt %, more preferably 70–100 wt %, especially all of the fat is fat originating from dairy milk, particularly cow's milk.

Component (A) has a continuous aqueous phase. The aqueous phase encompasses water, protein, and possibly other hydrophillic materials e.g. lactose, cooking salt and the like. Although the fat phase may include some minor components in addition to fat, e.g. colourant, in practice the amount of such minor components is typically very small. Therefore, for practical purposes, the amount of aqueous phase can usually be taken to consist of the composition minus the fat. The aqueous phase comprises a coagulated casein network and has a pH of 4.5–5.3. These properties are necessary to obtain the desired taste and texture attributes of component (A). For this purpose, the casein network should be neither too weak nor too strong and to achieve this, casein and water should be present in a weight ratio of 1:3 to 1:15. To obtain the desired texture for component (A), i.e. as primarily determined by the coagulated casein network, the component (A) preferably does not include melting salts such as sodium polyphosphates and the like.

Component (A) may also comprise other protein than casein, notably whey protein, but preferably component (A) does not contain protein other than protein of dairy origin except possibly for a small amount of gelatin. The use of gelatin is however neither necessary nor preferred. Preferably casein constitutes at least 65 wt %, more preferably 70–100 wt %, especially 75–90 wt %, of the protein present in component (A). The amount of protein calculated on the total weight of component (A), preferably is 8–25 wt %, more preferably 9–20 wt %, especially 10–16 wt %.

Casein can be caused to coagulate to form a network by the action of rennet or acid or both. Depending on the approach taken differences in structure can result. In component (A) the casein network preferably is predominantly acid coagulated casein network. This can be achieved by reducing the pH of a milk or a concentrated milk to a pH in the range of 4.3–5.3, preferably 4.5–4.9. Incorporating a small amount of rennet before or during the acidification may be beneficial, but the amount of rennet would preferably be much lower than the amount commonly employed for making renneted casein curd, e.g. as is done in the making of cheeses like Gouda and Cheddar. If the starting milk contains casein and water in amounts similar to that occurring in regular dairy milk, then the relative amount of casein must be increased to obtain the desired casein network strength. This can e.g. be done by removing whey after the casein coagulation e.g. in a centrifuge or by means of ultrafiltration. Alternatively, the casein to water ratio can be adjusted before the coagulation e.g. by means of ultrafiltration, vacuum evaporation or a combination thereof. If vacuum evaporation is employed, preferably it is done such that the lactose content of the product doesn't become too high. Preferably the lactose content of component (A) doesn't exceed 8 wt %, more preferably it is 1–6 wt %. A combination of the above approaches to obtain the desired ratio of casein and water can of course be used as well.

The pH of component (A) can be set to the right value using e.g. acid like lactic acid, citric acid, etc., or using glucono delta lactone. Preferably however the pH is achieved by souring a milk or a concentrated milk using a culture of lactic acid bacteria. This gives a more attractive taste.

The non-fat dry matter content of component (A) may comprise constituents of non-dairy origin, e.g. the agents used to obtain the required pH already mentioned above, salt, polysaccharide texturing agent, gelatin, colourant, emulsifier like mono and/or diglyceride and soybean lecithin, but preferably such constituents are present only in small amounts. The combined amount of non-fat constituents not of dairy origin preferably is less than 25 wt %, more preferably less than 20 wt %, especially less than 15 wt % of the non-fat dry matter of component (A). Relative to the aqueous phase composition of component (A) the combined amount of the non-fat dry constituents not of dairy origin preferably is less than 8 wt %, more preferably less than 6 wt %, especially less than 5 wt %.

It is particularly preferred for component (A) to be a fresh cheese containing water, casein and fat within the above defined limits and having the specified pH and Stevens value. Fresh cheese is a product made from a dairy milk by causing the casein to coagulate predominantly by the action of acid, wherein the water content is reduced before and/or after the coagulation and wherein the fat to casein ratio may be reduced or increased relative to that occurring in regular dairy milk. Fresh cheese contains no non-dairy constituents other than the agent used to cause the acid coagulation and optionally small amounts of rennet and salt and possibly colourant and polysaccharide gum like carrageenan, pectin, carboxy methyl cellulose or locust bean gum, or gelatin. Thus, fresh cheese encompasses products like quark, concentrated yoghurt, as well as products like Mon Chou®, L atta® fresh cheese and Philadelphia® fresh cheese. However, typical quark and concentrated yoghurt do not have sufficient firmness to be used as such as component (A). On the other hand, some fresh cheeses may be too firm to be able to obtain the desired organoleptic impression as well as good spreadability. If it is desired to use such kind of fresh cheese as component (A) in the present spread, the firmness should be adapted, e.g. by changing the water content of the composition and/or the processing conditions. Methods to adapt the firmness of fresh cheese are well known in the art.

The dairy milk may be a whole milk, a standardized milk, a reconstituted milk, a partially or wholly defatted milk or a concentrated version thereof. If a concentrated milk is used preferably the concentration is done by means of ultrafiltration. The milk preferably is cows' milk. It is suitably pasteurised at 70–90° C. for 20 seconds–20 minutes. The casein coagulation is preferably achieved by means of a lactic acid bacteria culture. To control the pH, after the souring has proceeded to the desired degree, further souring can be prevented by heating the composition to about 60° C. or 65° C. for a few minutes. If the casein to water ratio is too low after the coagulation whey can be removed using e.g. a centrifuge or ultrafiltration. If so desired the fat content can be adapted e.g. by incorporating butterfat or cream.

It is particularly preferred for component (A) to be a fresh cheese that during its preparation, subsequent to the coagulation of casein, has been subjected to a heat treatment at least sufficient to pasteurize the product. The heat treatment is preferably done at 65–95° C., especially 68–90° C. for a period of preferably 2–60 minutes, more preferably 3–30 minutes. Most preferably a heattreatment of about 5 minutes at about 70° C. is applied. Such heattreatment can be done before or after the whey removal, if any. It is further preferred to homogenise the composition, preferably at a pressure of at least 50 bar, more preferably 70–300 bar and preferably at a temperature of 65–95° C., especially 68–90° C. It is particularly desirable to homogenize the product if after coagulation still a fat source is incorporated. Homogenisation is preferably applied as the last processing treatment in the preparation of component (A), before it is filled in the container. It is particularly preferred for the component (A) to be a fresh cheese that subsequent to acid coagulation has been subjected to both heat treatment and homogenisation. Preferably the homogenisation is applied after the heat treatment. Other constituents e.g. salt can be incorporated at any convenient stage in the process, e.g. subsequent to whey removal, if done.

The cream (B) should comprise 15–60 wt % dispersed fat phase, consisting essentially of fat, and 40–85 wt % continuous aqueous phase, the aqueous phase comprising casein and water in a weight ratio of less than 1:15. Cream (B) preferably is acidified to prevent substantial increase of the pH of component (A) in the product due to migration. The pH of cream (B) is preferably chosen in the range 4.0–5.8, more preferably of 4.3–5.3. It is particularly preferred for the pH of component (A) and of cream (B) to differ less than 0.5 pH-units, especially less than 0.3 pH-units. To prevent the formation of a casein network in cream (B) of significant strength at such pH levels, which would adversely affect the mouthfeel of the end product, the weight ratio of casein and water in cream (B) should be less than 1:15, preferably it is from 1:20 to 1:100, especially from 1:25–1:50. The casein content of the cream (B) preferably is less than 5 wt %, more preferably less than 4 wt %, most preferably it is 1–3 wt %. The cream (B) may comprise other protein, notably whey protein, but preferably the total protein content of the cream (B) is less than 5 wt %, more preferably it is 2–4 wt %, while the weight ratio of protein and water in cream (B) is preferably between 1:15 and 1:100, more preferably between 1:20 and 1:40. To minimize migration it is further preferable for the difference in water-activity between component (A) and cream (B) to be small, e.g. less than 0.05, in particular less than 0.03.

For optimal textural properties we found it to be preferable for the cream (B) to comprise 18–45 wt % dispersed fat phase and 55–82 wt % continuous aqueous phase especially 20–40 wt % dispersed fat phase and 60–80 wt % continuous aqueous phase. The fat predominantly constituting the fat phase, preferably is fat of dairy milk origin, especially fat originating from cows' milk. Whereas in the component (A) fat of vegetable origin can readily be incorporated because of the casein network, incorporating substantial amounts of vegetable fat in cream (B) is more complicated and may in some cases require the use of added emulsifiers to stabilize the cream (B). The taste of cream (B) is relatively mild compared with that of component (A). Therefore the replacement of dairy fat with vegetable fat and the possible use of non-dairy emulsifier might adversely affect the taste of cream (B). Therefore the fat of cream (B) preferably is fat of dairy origin. However, if such adverse effect on taste is avoided and/or if e.g. nutritional considerations are of overriding importance, then part or all of the milk fat can be replaced with other fat, e.g. vegetable fat. Thus, a so-called non-dairy cream can be used as cream (B).

The cream (B) consists predominantly of fat and water, to provide the creaminess and the taste contrast with component (A). Therefore the fat in dry matter content of cream (B) is preferably high, e.g. at least 60 wt %. More preferably, the fat in dry matter content of cream (B) is 65–95 wt %, especially 75–90 wt %.

The cream (B) should have a firmness as expressed by the Stevens value at 5° C. of 75–500 g. This is more firm than most conventional creams. This elevated firmness is necessary to obtain optimal organoleptic behaviour as well as the desired spreadability.

We further found it to be preferable for the consistency of the cream (B) not to be too much different from that of component (A). This makes the product more pleasant to use for the consumer, e.g. when spreading it, and it also facilitates preparing a stable product that maintains its integrity during storage and distribution. The firmness of cream can e.g. be adapted by modifying the composition and/or the processing, e.g. by acidification and homogenisation. Especially homogenisation of the starting cream can raise the firmness. With acidification and homogenisation after pasteurisation, the firmness can be increased further. Cream (B) preferably comprises polysaccharide texturing agent and/or gelatin. Suitable polysaccharide texturing agents are for example carrageenan, alginate, pectin, locust bean gum, xanthan gum, etc. and combinations of 2 or more thereof. Locust bean gum is particularly preferred. The combined amount of polysaccharide texturing agent and gelatin preferably is 0.1–2 wt % calculated on cream (B), especially 0.2–1 wt %. In this way, we found, the desired consistency (i.e. firmness and texture) of the cream (B) can readily be obtained without substantially affecting its cream-like functionality as perceived in the mouth. The product may further include small amounts of other non-dairy constituents, e.g. salt and colourant.

The cream can conveniently be prepared in conventional manner by separating skim milk from dairy milk to obtain a cream with the desired composition e.g. in a centrifuge and incorporating a texturing agent, if appropriate, and/or applying homogenisation and acidification to obtain the desired firmness as described above. The cream can also be reconstituted if so desired by combining a cream with a higher than desired fat content with e.g. whole milk or skim milk. The starting milk or the cream may be pasteurised in conventional manner. The cream is preferably prepared from cows' milk.

Souring of the cream can be done using e.g. organic acid, but to obtain optimal flavour, souring is preferably done using a culture of lactic acid bacteria. After the desired pH has been reached further souring can be prevented by briefly heating the cream to about 60° C. or 65° C.

Salt and colorant, if any, can be incorporated in the cream at any convenient stage.

If polysaccharide texturing agent and/or gelatin is to be incorporated, after the addition thereof to the cream, e.g. as a solution or slurry thereof in water or cream, preferably the composition is mixed and given a heattreatment at least sufficient to pasteurize the product. It can also be beneficial, for the texture of the resulting product to pass the composition through a homogenizer, e.g. at a pressure of 50–600 bar and a temperature of 50–90° C., especially at 50–300 bar and 50–75° C.

As already mentioned above, the consistency of the component (A) and of the cream (B) is preferably not very different. The consistency or firmness of a product can suitably be characterised by means of the Stevens value. The Stevens value at temperature t°C. (St t) expressed in grams can suitably be measured using a Stevens LFRA Texture Analyzer (ex Stevens Advanced Weighing Systems, Dunmore, UK) using a 12.7 mm diameter probe, loadcell 1000 g, operated "normal", penetration depth 20 mm, penetration rate 2.0 mm/s. Before measurement, samples are conditioned for 3 days at 5° C. and then 24 hours at the measuring temperature. For the present purposes, component (A) and cream (B) are best filled into separate containers for measurement of the Stevens values.

Preferably the St 5 value of the component (A) is 175–450 g, especially 200–350 g. The St 5 value of cream (B) preferably is 85–350 g, especially 100–300 g. It is particularly preferred for the difference in St 5 value between component (A) and cream (B) to be 0–300 g, especially 0–200 g. If there is a difference in firmness between the two components then preferably component (A) has a higher St 5 value than component (B).

To obtain good keepability of the spread, preferably component (A) and cream (B) have both been pasteurised and are filled into the package at a temperature of at least 65 ° C., preferably at least 68° C. Preferably the pack is hermetically closed, e.g. sealed while the product temperature is still at or above 65° C., preferably at or above 68° C. Preferably the product is then cooled to below e.g. 20° C., e.g. in a cooling tunnel. Full development of the firmness of the product may take some time, and especially during this period rough handling of the product should be avoided to prevent unintended mixing of the components.

To arrange that component (A) and cream (B) are present in the pack inhomogeneously combined, a number of different approaches can be followed. For example, first a layer of one of the two components can be poured into the container that is to serve as pack and then the other component can be poured on top. If so desired a series of alternating layers can be applied. If the two components have different colours and the container is transparent, e.g. a transparent plastic tub or a glass jar, then the alternating layers can be seen by their different colours from the outside.

Alternatively, controlled amounts of component (A) and cream (B) can be pumped in a small holding vessel just before the filling head of the packing line, only very slow stirring or no stirring at all is applied in the holding vessel to ensure that the product in the pack still contains the two components in inhomogeneous combination. The holding vessel can also be omitted, and the two component streams can be combined in a short common pipe just before the filling head. In such embodiments, to prevent the components from becoming homogenously combined, preferably the components are cooled down, e.g. to below 25° C., before they are fed to the holding vessel or common pipe. To ensure the microbiological quality of the product, the production line downstream of the pasteurisation of the component (A) and the cream (B), should preferably be aseptic.

Preferably however, to obtain troublefree production, and product of consistent and high quality, the component (A) and the cream (B) are each extruded through one or more extrusion mouths into the container, the extrusion rates being controlled such that the product comprises 10–95 wt % of component (A) and 5–90 wt % of cream (B). Preferably component (A) and cream (B) are extruded simultaneously into the container. In this way, if the two components have different colours, the surface of the product, after opening the container, shows the different colours. This can be visually attractive. This embodiment of simultaneous extrusion also makes it easy for the consumer to take product from both a region consisting predominantly of component (A) and a region consisting predominantly of cream (B).

In particular we found it to work well to use for filling the components into the pack a single nozzle construction that contains both the extrusion mouth(s) through which component (A) is extruded and the extrusion mouth(s) through which cream (B) is extruded. For example to obtain the grapefruit-like pattern described above, suitably a cylindrical pipe having fitted therein a piece, e.g. of teflon, with a starlike cross-section, which creates e.g. 6 or 8 channels in a circular arrangement for product to pass through, can be used. The connections between the channels and the supply of cream (B) and component (A) are made such that if component (A) is fed to a particular channel, cream (B) is fed to the two adjacent channels, and next to these, component (A) is fed, etc.

Attractive patterns can also be obtained by moving the container and the extrusion mouths relative to each other during the extrusion. For example, with rotation, spiral like patterns of component (A) and cream (B) can be made in the pack. Another attractive way of filling the product in the container, is for component (A) and cream (B) to constitute a yin yang symbol. Other patterns can of course be employed as well. Making the nozzles and other filling equipment to create such patterns is well within the abilities of the skilled person.

To obtain good keepability and prevent microbiological problems from occurring, preferably component (A) and cream (B) are preferably extruded at a temperature of at least 65° C., more preferably at least 70° C. On the other hand, the temperature should preferably not be too high. Else the components may become very thin and more mixing may occur during filling between the components than is desirable. Therefore, the temperature at which components (A) and (B) are extruded is preferably not higher than 95° C., more preferably it is not higher than 85° C.

To minimize mixing of the components we found it to be preferable for the component (A) and the cream (B) at the extrusion stage to have similar viscosities. The viscosity at the stage of extrusion can be adapted by changing the temperature of the composition that is extruded, by adapting its composition, e.g. its dry matter content and the amount and type of thickening or gelling agent and/or by the process by which it is prepared, e.g. homogenisation pressure, temperature and duration of the heattreatment in the preparation of component (A) etc. Optimizing such parameters to obtain a suitable viscosity at the extrusion stage is well within the abilities of the skilled person.

Throughout this specification all parts, proportions and percentages are expressed by weight except where indicated otherwise.

EXAMPLE 1

Cow's milk standardized at 2.5 wt % fat and pasteurised for 40 seconds at 72° C. was acidified with a mesophyllic culture to pH 4.6. The milk was heated to 60° C. to stop the acidification and cooled down to 50° C. whereafter the milk was ultrafiltrated to a dry matter content of 29 wt %. The retentate was mixed with 0.8 wt % cooking salt and 0.2 wt % Locust Bean Gum (LBG), heated at 74° C. for 15 minutes and homogenised at 100 bar resulting in the fresh cheese part of the final product (component A).

Cream from cow's milk of 31 wt % fat was heated at 85° C. for 10 minutes, homogenised at 200 bar and acidified with a mesophyllic culture to pH=4.6. The acidified cream was mixed with 0.4 wt % cooking salt, 0.4 wt % LBG and 0.03 β-carotene (4 wt %), heated to 74° C. and homogenised at 100 bar. This creme fraiche part (cream B) was filled at 74° C. together with the fresh cheese into tubs in a ratio 70 fresh cheese: 30 creme fraiche. The two components were filled simultaneously through a nozzle containing 12 extrusion mouths in circular arrangement, in round tubs of 250 g like the parts of a grapefruit, 6 small parts of creme fraiche alternated by 6 parts of fresh cheese. The tubs were sealed and the products so obtained were cooled down and stored at 5° C.

The composition and Stevens value at 5° C. of the two components was:

|  | wt % | |
| --- | --- | --- |
|  | fresh cheese | creme fraiche |
| casein | 11.2 | 1.6 |
| wheyprotein | 2.8 | 0.4 |
| fat | 9.5 | 30.5 |
| lactose | 3.5 | 3.0 |
| water | 70.5 | 62.5 |

-continued

|  | wt % | |
| --- | --- | --- |
|  | fresh cheese | creme fraiche |
| other | 2.5 | 2.0 |
| St 5° C. | 250 g | 160 g |

After 3 days the product was evaluated. Both components were clearly recognizable; visible in the tub but also at tasting the product. A panel trained in characterising fresh dairy products, characterised the product as follows: The product has very good spreadability.

At the moment the product is put in the mouth, the two components, simultaneously, give an opposite feeling: the product is cool and fresh as well as warm and creamy. First the fresh component dominates the sensation, soon followed by the feeling that the creamy component spreads out coating the mouth with a smooth film layer while the freshness temporarily seems to disappear. Finally the freshness returns and dominates again.

Compared with product that was produced by thoroughly stirring the two components together, the product of the example was more fascinating to eat, was more fresh and gave a less fatty mouthfeel.

A group of people who were asked for their preference, strongly preferred the product of the example compared with the product obtained after stirring the components through each other.

Comparative Example A

Pasteurized milk standardized at 2.5 wt % fat was mesophyllic acidified to pH 4.6. The milk was heated to 60° C. to stop the acidification and cooled down to 50° C. The milk was ultrafiltrated to a dry matter content of 29 wt % (component 1).

Cream of 31 wt % fat was heated heated at 85° C. for 10 minutes, homogenised at 200 bar and acidified with a mesophyllic culture to pH=4.6 (component 2).

69 wt % of component 1 was mixed with 30 wt % of component 2, 0.7 wt % salt and 0.3 wt % LBG. This mix was heated to 74° C., homogenised at 100 bar and filled in tubs. The product was cooled down and stored at 5° C.

This product differed clearly from the product of example 1. Tasting the product gave no special sensation, no separate components could be perceived in the mouth, neither in taste nor in mouthfeel. The product overall rather resembled a normal cream cheese.

EXAMPLE 2

Fresh cheese was prepared as in example 1, except that the acidification was done to pH 4.7.

90 Parts dairy cream standardized to a fat content of 26 wt % were pasteurized at 85° C. for about 10 minutes and mixed with a solution of 0.8 parts gelatin, 0.8 parts whey protein concentrate (70%) and 0.3 parts salt, dissolved in 8 parts skim milk. After cooling down to a suitable temperature a common lactic acid culture was added, whereafter the fermentation was allowed to proceed until a pH value of about 4.8 was reached. The fermentation was stopped by heating to 80° C. The product so obtained was homogenized at 100 bar and filled simultaneously with component A in a ratio of 50:50 in 100 g tubs, such that each component occupied one half of the tub. The product was cooled down to below 10° C. and stored at 5° C.

The composition of the fresh cheese was very similar to that of the fresh cheese of example 1. The composition of the cream was:

|  | wt % |
|---|---|
| casein | 1.6 |
| wheyprotein | 1.1 |
| fat | 23.5 |
| lactose | 3.0 |
| water | 67.5 |
| other | 3.3 |

Tasting this product, the taste and texture of these 2 components could be separately perceived in the mouth, giving a very unusual but pleasant organoleptic impression.

EXAMPLE 3

Standardized, pasteurized, homogenized milk with a fat content of 2.3 wt % was acidified with a mesophyllic starter culture. When the pH reached 4.6, the milk was heated to 90° C. and kept at this temperature for 30 minutes. Whey was then removed by passing the milk through a centrifuge separator. The resulting composition had a dry matter content of 27.5 wt %. The obtained curd was mixed with 0.7 wt % cooking salt, pasteurised at 75° C. for 5 minutes and homogenised at that temperature using a pressure of 150 bar. The resulting component (A) was combined with a cream (B) as described in example 1. A good spread quite similar to that of Example 1 was obtained.

We claim:

1. A packed dairy spread comprising:
   A) 10–95 wt. % of a component (A)
      (i) comprising a coagulated casein network, having a pH of 4.3–5.3 and containing casein and water in a weight ratio of 1:3 to 1:15, the component (A) comprising 0–50 wt. % (based on component (A)) dispersed fat phase and 50–100 wt. % (based on component (A)) continuous aqueous phase and having a Stevens value at 5° C. of 150–700 g, and
   B) 5–90 wt. % of a cream (B) comprising 15–60 wt. % (based on component (B)) of dispersed fat phase and 40–85 wt. % (based on component (B)) continuous aqueous phase, the aqueous phase comprising casein and water in a weight ratio of less than 1:15, the cream (B) having a Stevens value at 5° C. of 75–500 g wherein the component (A) and the cream (B) are inhomogeneously combined in the packed spread and wherein said spread comprises one or more regions predominantly consisting of component (A) and one or more regions predominantly consisting of cream (B) wherein the average distance between the center of a region of component (A) and the center or centers of the one or more adjacent regions of cream (B) is in the range of 0.1–8 cm.

2. Spread according to claim 1 wherein the component (A) is a fresh cheese.

3. Spread according to claim 1 wherein the cream (B) has a fat in dry matter content of at least 60 wt %.

4. Spread according to claim 1 wherein the cream (B) comprises protein and water in a weight ratio of 1:15 to 1:100.

5. Spread according to claim 1 wherein the cream (B) has a pH of 4.0–5.8.

6. Spread according to claim 1 wherein the cream (B) comprises an ingredient selected from the group consisting of polysaccharide texturing agent and gelatin.

7. Spread according to claim 1 wherein the component (A) has a firmness as characterised by the Stevens value at 5° C. of 175–450 g and the component (B) has a firmness as characterised by the Stevens value at 5° C. of 85–350 g.

8. Process for preparing a packed dairy spread according to claim 1, wherein a component (A) according to claim 1 is extruded through one or more extrusion mouths into a container, and a cream (B) according to claim 1 is extruded through one or more separate extrusion mouths into the same container, and the filled container is closed, wherein the extrusion is controlled such that the closed container contains 10–95 wt % of said component (A) and 5–90 wt % of said cream(B).

9. Process according to claim 9 wherein the component (A) and the cream (B) are each extruded at a temperature of 60–95° C.

* * * * *